US 8,139,491 B2

(12) United States Patent
Nakata

(10) Patent No.: US 8,139,491 B2
(45) Date of Patent: Mar. 20, 2012

(54) COMMUNICATION METHOD, NODE, AND CONTROL PROGRAM

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 12/294,846

(22) PCT Filed: Mar. 27, 2007

(86) PCT No.: PCT/JP2007/056382
§ 371 (c)(1),
(2), (4) Date: Sep. 26, 2008

(87) PCT Pub. No.: WO2007/111331
PCT Pub. Date: Oct. 4, 2007

(65) Prior Publication Data
US 2010/0172243 A1  Jul. 8, 2010

(30) Foreign Application Priority Data
Mar. 29, 2006  (JP) ................................. 2006-091271

(51) Int. Cl.
*H04J 1/16* (2006.01)
(52) U.S. Cl. .......................... 370/237; 370/232; 370/231
(58) Field of Classification Search .................. 370/254, 370/392, 396, 397, 351, 255, 400, 401, 410, 370/238, 256, 395, 230, 230.1, 231, 233, 370/234, 235, 237, 253; 709/238, 239, 240, 709/241, 242
See application file for complete search history.

(56) References Cited

U.S. PATENT DOCUMENTS

| 6,347,091 | B1 * | 2/2002 | Wallentin et al. ............. 370/238 |
| 6,542,468 | B1 * | 4/2003 | Hatakeyama .................. 370/238 |
| 6,865,160 | B1 * | 3/2005 | Bare ............................. 370/256 |
| 7,453,847 | B2 * | 11/2008 | Wallentin et al. ............. 370/329 |
| 2006/0268721 | A1 * | 11/2006 | Lee et al. ...................... 370/237 |
| 2007/0002748 | A1 * | 1/2007 | Nakata et al. ................. 370/238 |

FOREIGN PATENT DOCUMENTS

| EP | 1705845 A1 | 9/2006 |
| JP | 2002152258 A | 5/2002 |
| JP | 2002314584 A | 10/2002 |
| WO | 2005067227 A | 7/2005 |
| WO | 2005901571 A2 | 9/2005 |

OTHER PUBLICATIONS

Supplementary European Search Report for EP 07 73 9820 completed Mar. 9, 2010.
J. C. Funk et al., "Inverse Multiplexing in Short-Range Multi-Transport Wireless Communications", Wireless Communications and Networking 2003, IEEE. 2003, pp. 757-762, XP010639861.

(Continued)

*Primary Examiner* — Huy Vu
*Assistant Examiner* — Dady Chery

(57) ABSTRACT

A scheduled transmission path of each packet to be transmitted is so determined that the order of predicted arrival time at a reception node is equal to the order of arrival time at a transmission node from estimate values of delay and velocity of each path. Only a packet predicted to arrive within the maximum permissible delay of each path is transmitted among the packets. This enables both of optimum allocation of the load between the paths and the prevention of a delay increase due to multiplexing.

13 Claims, 6 Drawing Sheets

OTHER PUBLICATIONS

International Search Report for PCT/JP2007/056382 mailed May 15, 2007.
T. Nakata et al., "Idotai Internet (2)", 2004 Nen The Institute of Electronics, Information and Communication Engineers Sogo Taikai Yokoshu 1, B-5-164, The Instutute of Electronics, Information and Communication Engineers Mar. 8, 2004, p. 651.
K. Sklower et al., "The PPP Multilink Protocol (MP)", Network Working Group, RFC1990, Aug. 1996. p. 1-24.
M. Isomura et al., "Performance Evaluation of Inverse Multiplexing of Heterogeneous Communication Media for Mobile Router", Proceedings of FIT2004 (the 3rd Forum on Information Science and Technology), M-070, p. 239-240, 2004.
Cisco Systems, "Load Balancing with Cisco Express Forwarding", Cisco Application Note, Jan. 1998.
T. Nakata et al., "Efficient bundling of heterogeneous radio resources for broadband Internet access from moving vehicles", in proceedings of Global Mobile Congress 2004, Oct. 11-13, 2004, Shanghi, China.

* cited by examiner

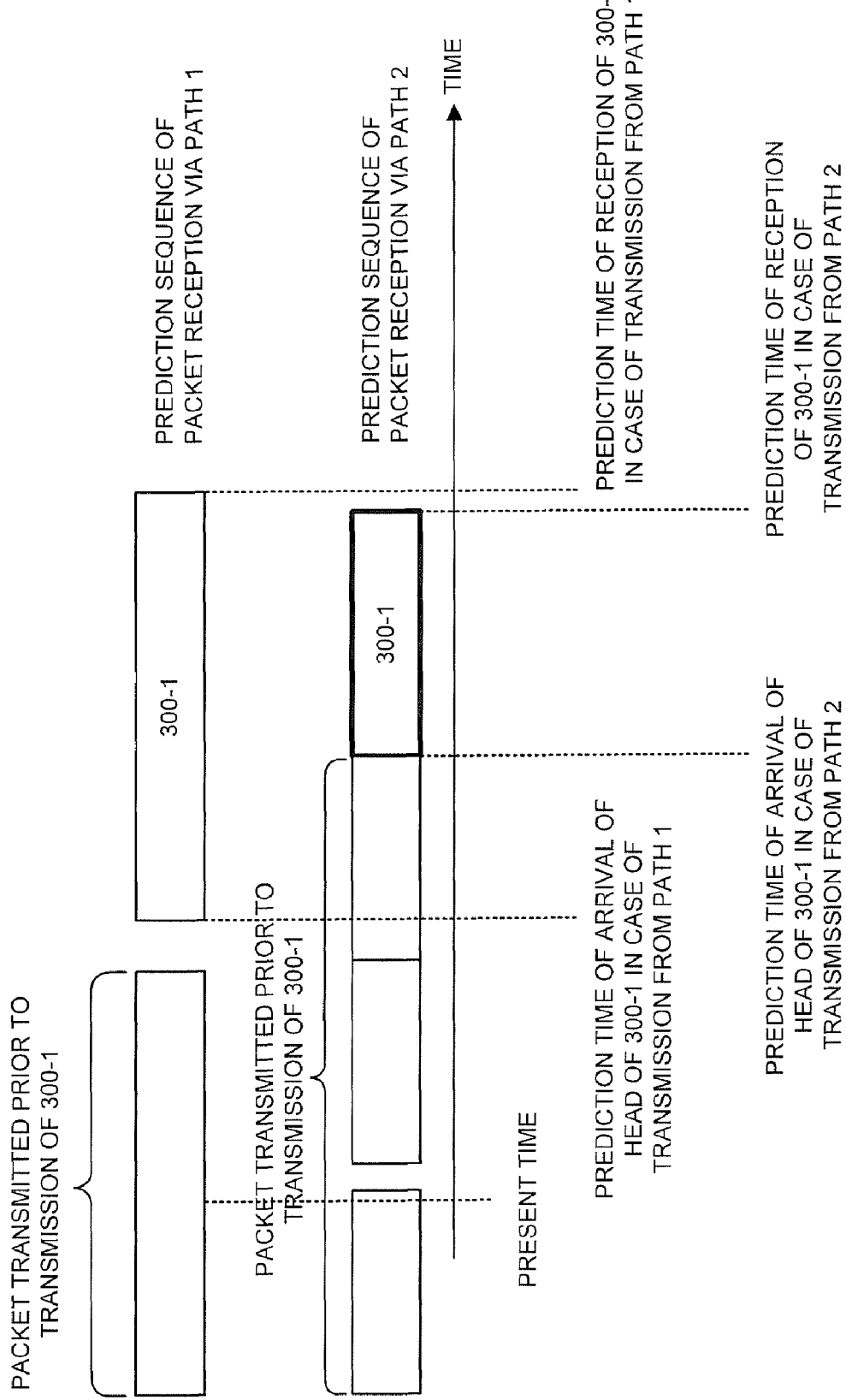

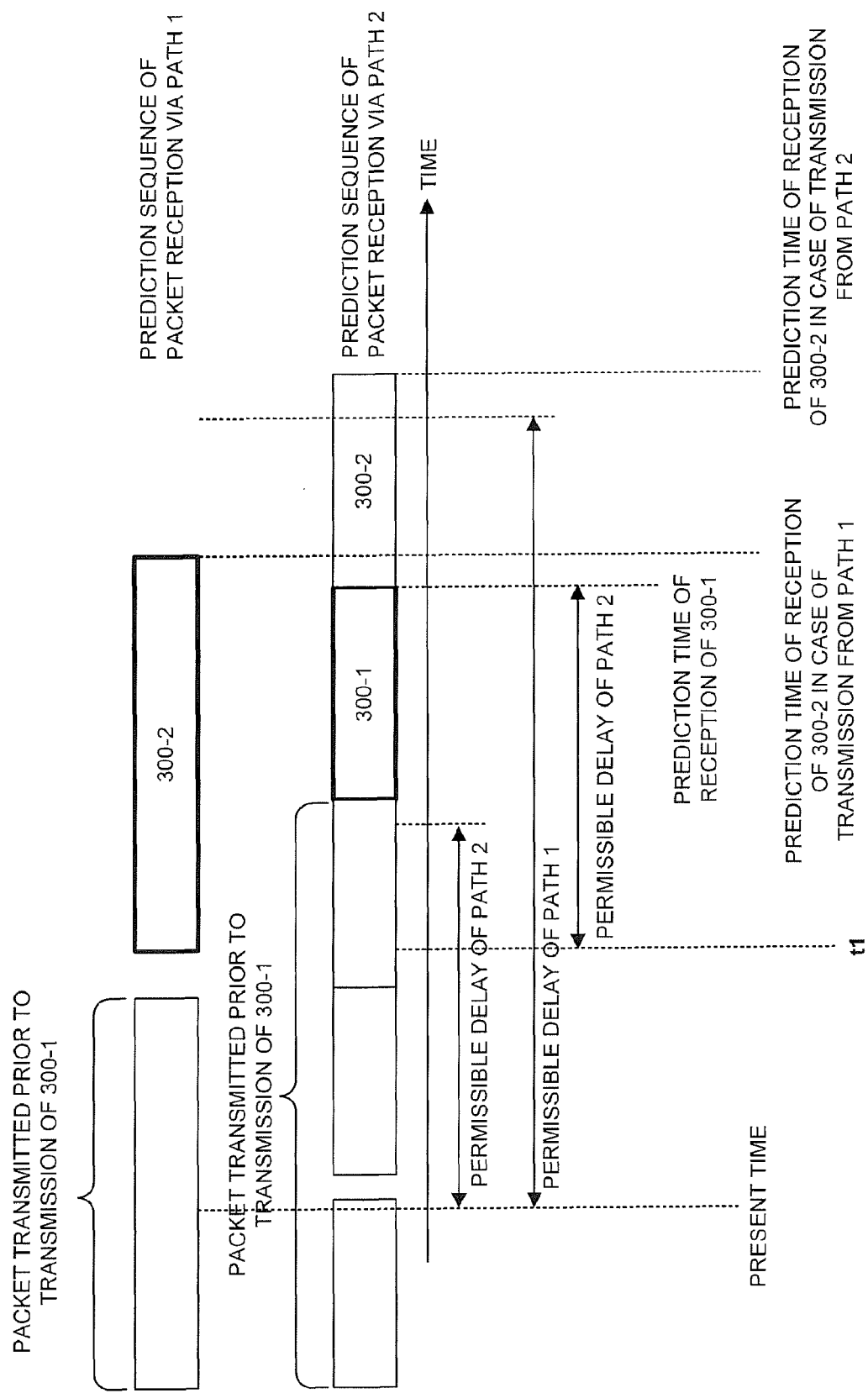

COMMUNICATION METHOD, NODE, AND CONTROL PROGRAM

APPLICABLE FIELD IN THE INDUSTRY

The present invention relates to a communication method, a node, and a control program, and more particularly to a communication method, a node, and a control program in a multiplexing communication of a plurality of paths.

BACKGROUND ART

Upon exemplifying the known technology of multiplexing a plurality of communication paths, thereby to configure one wide-band logical link, Multilink PPP described in Non-patent document 1, the inverse multiplexing technique over ATM described in Non-patent document 2, or the like is known as a method of multiplexing only communication paths in a ground, and further, the inverse multiplexing technology described in the Non-patent document 2 is known as a method of multiplexing wireless links. Each of these technologies provides a transfer link having a wide band exceeding a band of a single path by distributing the load between the paths.

As a method of load distributing, the weighted round robin technique of, at the moment of multiplexing the communication paths on the ground, carrying out weighting that corresponds to a velocity of each path, and circulatingly selecting a transmission path, which is described in Non-patent document 4, is widely known. However, in this method, an estimation velocity of each path has to be pre-set, which causes a problem that applying this method to multiplexing of the path including a wireless link of which a velocity or a delay frequently fluctuates gives rise to a decline in a transfer efficiency caused by a difference between the estimation velocity and the actual velocity at each time even though the average velocity of the wireless link etc. is set as an estimation velocity As a technology of solving this problem, the load distributing technique, which envisages multiplexing of the wireless link, is described in Non-patent document 3. This technology is a technique of selecting the transmission path based upon a margin of a transmission buffer of each link, as in the case of the inverse multiplexing technique. However, this method as well is effective only when a transmission node is directly coupled to a bottleneck link, and a load of a bottleneck link can be estimated from an margin of the transmission buffer, and there exists a problem that this method is not applicable to a two-way communication because, in the path including a plurality of the links, the situation in which any node cannot be directly coupled to the bottleneck occurs.

As a load distributing technique for solving this problem, the Mobile InverseMux technology in which both nodes exchange an estimation result of the velocity and the delay of each path with each other, compare a prediction delay of each of the links with that of the other based upon its estimation result, and select the transmission path, which is described in Non-patent document 5, is known.

Non-patent document 1: RFC1990
Non-patent document 2: Langdon, Robin D., "Imuxing ATM, Bit by Bit." Larscom white paper, 1997.
Non-patent document 3: Manabu Isomura, Naoki Imai, Kiyohito Yoshihara, and Hiroki Horiuchi, "Performance Evaluation of Inverse Multiplexing of Heterogeneous Communication Media for Mobile Router", proceedings of FIT2004 (the 3rd Forum on Information Science and Technology), M-070, pp. 239-240 (2004).
Non-patent document 4: Cisco Systems, "Load Balancing with Cisco Express Forwarding," Cisco Application Note, January 1998.
Non-patent document 5: T. Nakata et al., "Efficient bundling of heterogeneous radio resources for broadband Internet access from moving vehicles," in proceedings of Global Mobile Congress 2004, Oct. 11-13, 2004, Shanghi, China.

DISCLOSURE OF THE INVENTION

Problems to be Solved by the Invention

Any of the related arts mentioned above distributes the load between the paths, thereby to provide the transfer link having a large capacity that cannot be realized with a single path.

Employing the load distributing by the weighted round robin technique, being a related art, making it possible to equalize the load upon each path that is comprised of only the ground links of which the velocity is stable; however when the delay of each of the paths differ from that of the other, the delay as an entirety of the multiplexing link becomes equal to the delay of the path having a largest delay. For this, the delay of the multiplexing link becomes large as compared with that of the path having a small delay, out of the to-be-multiplexed paths. As a result, there exists a problem that a performance improvement that the band is enlarged owing to the multiplexing is obtained, whereas a performance deterioration that the delay augments occurs.

Further, no increase in the delay caused by the multiplexing occurs so long as the packet is transmitted to the path having a smallest prediction delay in a case of employing the Mobile InverseMux, being a related art, to distribute the load between the paths including the wireless link; however, as a result of doing so, it is only when the load equivalent to a delay difference between both paths or more than it has been placed upon the path having a small delay that the load is placed upon the path having a large delay, and it is only in such a case that an effect of the band enlargement is manifested. That is, the load becomes difficult to distribute when a delay difference between the paths is large. So as to avoid this problem, by setting a maximum value of a permissible delay to each path and yet setting this permissible delay at a low level for the path of which the delay is originally small, it is also possible to allow the load to be easily distributed to the path as well having a large delay; however, in this case, an increase in the delay due to the multiplexing occurs similarly to the case of the weighted round robin technique.

In such a manner, any of the related arts causes a problem that optimum allocation of the load between the paths and prevention of a delay increase due to the multiplexing are not compatible with each other in a case of multiplexing the paths each having a different delay.

Thereupon, the present invention has been accomplished in consideration of the above-mentioned problems, and an object thereof is to provide a technology of allowing optimum allocation of the load between the paths and prevention of a delay increase due to the multiplexing to be compatible with each other.

Means to Solve the Problem

The 1st invention for solving the above-mentioned problems, which is a communication method between two nodes that can utilize a plurality of paths including at least each of a first path and a second path, characterized in that, when congestion of the second path is predicted or detected, after a second packet of which an arrival time is slow, out of two packet or more having arrived at a first node, is transmitted from the first path, a first packet of which an arrival time is early is transmitted from the second path.

The 2nd invention for solving the above-mentioned problems, in the above-mentioned 1st invention, is characterized in that transmission of said first packet from said second path is made after predicting or detecting removal of the congestion of said second path.

The 3rd invention for solving the above-mentioned problems, in the above-mentioned 1st or 2nd inventions, is characterized in deciding a prediction of said congestion or a prediction of removal of said congestion based upon a transmission history of each path.

The 4th invention for solving the above-mentioned problems, in the above-mentioned 1st or 2nd inventions, is characterized in deciding a prediction of said congestion or a prediction of removal of said congestion based upon an estimation velocity of each path.

The 5th invention for solving the above-mentioned problems, which is a communication method between two nodes that can utilize a plurality of paths including each of a first path and a second path, characterized in, when a plurality of packets having arrived at a first node are transmitted to a second node, deciding transmission paths of said plurality of the packets from estimation values of a delay and a velocity of each path so that an order of prediction times of arrival of said plurality of the packets at said second node becomes equal to an order in which said plurality of the packets arrived at said first node, and transmitting only the packet, which is predicted to arrive at the second node without causing congestion to occur in each path, out of said plurality of the packets, to the decided transmission path.

The 6th invention for solving the above-mentioned problems, in the above-mentioned 5th invention, is characterized in making a determination of said prediction arrival time or said congestion based upon a transmission history of each path.

The 7th invention for solving the above-mentioned problems, in the above-mentioned 5th invention, is characterized in making a determination of said prediction arrival time or said congestion based upon an estimation velocity of each path.

The 8th invention for solving the above-mentioned problems, which is a node that can utilize a plurality of paths including at least each of a first path and a second path, characterized in comprising a means for obtaining prediction times of arrival of a plurality of received packets at other node based upon estimation values of a delay and a velocity of each path, and deciding transmission paths of said plurality of the packets based upon said prediction arrival times so that an order of arrival of said plurality of the packets at said other node becomes equal to an order in which said plurality of the packets arrived.

The 9th invention for solving the above-mentioned problems, in the above-mentioned 8th invention, is characterized in comprising a means for transmitting only the packet, which is predicted to arrive at said other node without causing congestion to occur in each path, out of said plurality of the packets, to the decided transmission path.

The 10th invention for solving the above-mentioned problems, in the above-mentioned 8th or 9th inventions, is characterized in making a determination of said prediction arrival time or said congestion based upon a transmission history of each path.

The 11th invention for solving the above-mentioned problems, in the above-mentioned 8th or 9th inventions, is characterized in making a determination of said prediction arrival time or said congestion based upon an estimation velocity of each path.

The 12th invention for solving the above-mentioned problems, which is a control program for a node that can utilize a plurality of paths including at least each of a first path and a second path, characterized in causing the node to executing a process of obtaining prediction times of arrival of a plurality of received packets at other node based upon estimation values of a delay and a velocity of each path, and deciding transmission paths of said plurality of the packets based upon said prediction arrival times so that an order of arrival of said plurality of the packets at said other nodes becomes equal to an order in which said plurality of the packets arrived.

The 13th invention for solving the above-mentioned problems, in the above-mentioned 12th invention, is characterized in causing the node to execute a process of transmitting only the packet, which is predicted to arrive at said other node without causing congestion to occur in each path, out of said plurality of the packets, to the decided transmission path.

The 14th invention for solving the above-mentioned problems, in the above-mentioned 12th or 13th inventions, is characterized in making a determination of said prediction arrival time or said congestion based upon a transmission history of each path.

The 15th invention for solving the above-mentioned problems, in the above-mentioned 12th or 13th inventions, is characterized in making a determination of said prediction arrival time or said congestion based upon an estimation velocity of each path.

So as to solve the problems mentioned above, the present invention decides the schedule transmission path of each packet being transmitted from estimation values of the delay and the velocity of each path so that the order of the prediction time of arrival at a reception node becomes equal to that of the time that the packets arrived at a transmission node, and transmits only the packet, which is predicted to arrive at each path within the permissible maximum delay, out of the packets.

For example, at the moment of transmitting a packet 1 having previously arrived at the transmission node and a packet 2 having later arrived, the packet 2 is transmitted to the first path, and the packet 1 is transmitted from the second path after a congestion status (a status in which the prediction delay has exceeded the maximum delay) of the second path is removed when the prediction delay of a low-velocity first path, out of the to-be-multiplexed paths, is larger than that of a high-velocity second path, and the prediction delay of the second path has exceeded the maximum delay. By doing so, the order of transmission of the packet from the transmission node, which differs from the order of arrival at the transmission node, becomes identical to that of arrival at the transmission node in such a manner that the order of arrival of the packet 1 at the reception side node is forward, and the order of arrival of the packet 2 is backward, and further, both of the packet 1 and the packet 2 arrive by the delay equal to less than the delay that occurs in the case of employing only the high-velocity path 2 and yet the load is distributed to both of the path 1 and the path 2.

An Advantageous Effect of the Invention

The present invention makes enables the optimum allocation of the load between the paths and the prevention of a delay increase due to the multiplexing to be compatible with each other.

BRIEF DESCRIPTION OF THE DRAWINGS

FIG. 5 is a view for explaining the embodiment.
FIG. 6 is a view for explaining the embodiment.

Figure 1:
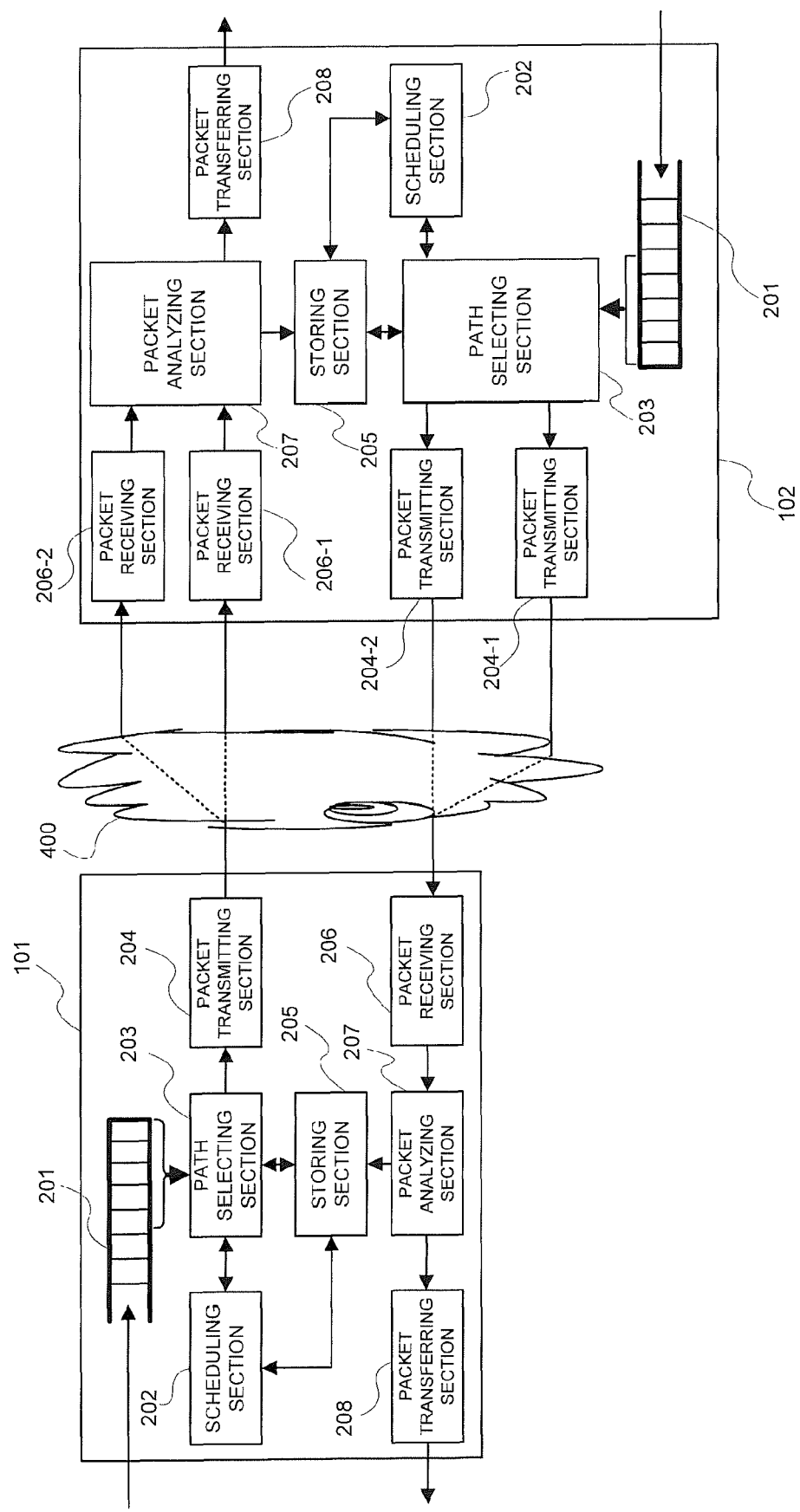
FIG. 1 is one configuration view of the embodiment.

DESCRIPTION OF NUMERALS 101 and 102 communication nodes
201 input queue
202 scheduling section
203 path selecting section
204 packet transmitting section
205 storing section
206 packet receiving section
207 packet analyzing section

BEST MODE FOR CARRYING OUT THE INVENTION

An embodiment of the present invention will be explained.

This embodiment is carried out between two nodes for utilizing a plurality of the communication paths, thereby to make a communication. In an example shown in FIG. 1, a communication node 101 includes a packet transmitting section 204 and a packet receiving section 206 of which the number is one, respectively, whereas a communication node 102 includes the packet transmitting section 204 and the packet receiving section 206 of which the number is two, respectively.

As a path from the node 101 up to the node 102, there exist two paths, i.e. a path having the packet transmitting section 204 of the node 101 as a starting point, and a packet receiving section 206-1 of the node 102 as a finishing point, which goes through a network 400, and a path having the packet transmitting section 204 of the node 101 as a starting point, and a packet receiving section 206-2 of the node 102 as a finishing point, which goes through the network 400. Further, as a path from the node 102 up to the node 101, there exist two paths, i.e. a path having a packet transmitting section 204-1 of the node 102 as a starting point, and the packet receiving section 206 of the node 101 as a finishing point, which goes through the network 400, and a path having a packet transmitting section 204-2 of the node 102 as a starting point, and the packet receiving section 206 of the node 101 as a finishing point, which goes through a network 400. In such a manner, even though the number of the packet transmitting/receiving section of the node 101 is one pair, plural paths are configurable when the node 102 facing the node 101 includes a plurality of the packet transmitting/receiving sections, and the embodiment to be explained hereinafter can be similarly carried out also in a configuration shown in FIG. 2 in which each of both nodes include a plurality of the packet transmitting/receiving sections.

A packet analyzing section 207 of each of both nodes analyzes a status of each path from an arrival time and an arrival time period of the packet, and transmits a notification of the path situation to a correspondent node. On the other hand, the packet analyzing section 207, when having received the notification, stores the latest path situation based upon the text of the notification in a storing section 205. The scheduling section 202 decides the packet transmission order, the packet transmission time, and the path being employed for transmission of each packet based upon the path information recorded in the storing section 205, and notifies them to a path selecting section. The path selecting section 203 takes out the input packets from an input queue 201 based upon the notification by the scheduling section 202, and transmits each of them at the time and from the path designated by the scheduling section.

Next, an operation of the scheduling section 202 in the cased that a plurality of the packets exist in the input queue 201 of the node 101 will be explained. The scheduling section 202 of the node 101 operates according to an operational flowchart (SDL process graph) of FIG. 3. That is, the following operation is started by a scheduling request by the path selecting section.

At first, the scheduling section 202, upon receipt of the request for scheduling j packets from the path selecting section 203 (Step 100), obtains the prediction reception time in the case of having transmitted each packet for which the scheduling request has been made from each path, in the order of the arrival at the input queue 201 (Step 102) with i defined as i=1 (step 101). Herein, the so-called prediction reception time is a time that the end of the packet is predicted to arrive at the correspondent node 102. As a result, the path of which the prediction reception time is smallest is assumed to be a transmission path of the packet in question (Step 103). FIG. 5 shows an example of predicting the arrival time of a first-place packet 300-1. The path 2 of which the prediction arrival time, i.e. the prediction reception time of the end of the packet is earlier becomes a transmission path because the velocity of the path 2 is higher that of the path 1 even though the prediction arrival time of the head of the packet in the path 1 is earlier. The reception times of the packets of which the order of arrival at the input queue 201 is second-place and later than it are predicted on the assumption that all of the packets of which the arrival order is younger have been transmitted from the transmission path decided according to the above procedure.

FIG. 6 shows an example of predicting the arrival time of a second-place packet 300-2. Herein, the prediction reception time in the path 1 is earlier because the delay in the path 2 due to transmission of 300-1 increases, so the path 1 becomes a transmission path of the packet 300-2.

Next, a congestion status of each path is confirmed and predicted to obtain a transmittable time (Step 104). Additionally, the so-called congestion status signifies a status in which the packet cannot be immediately transmitted because the prediction delay of the path is equal to or more than a permissible value. The permissible value of the delay is pre-set, or is decided by the scheduling section 202 according to a link status. In FIG. 6, the path 2 is in a congestion status because the prediction reception time of 300-1 that should be transmitted in the path 2 is more futuristic than the present time by the permissible delay of the path 2 or more. In order that the prediction delay of the packet 300-1, i.e. the difference between the prediction reception time and the transmission time of the packet 300-1 becomes equal to less than the delay permissible value of the path 2, the transmission time needs to be t1, or later than it. This t1 is assumed to be a transmittable time of the packet 300-1. On the other hand, the transmittable time in the path 1 is an "instant" because the path 1, being a transmission path of the packet 300-2, is not in a congestion status.

The scheduling section 202, while incrementing i by 1 (Step 107), performs the process above until i=j is yielded, and when i=j is yielded (Step 105), notifies the transmission path and the transmittable time of each packet within the input queue 201 to the path selecting section 203 (Step 106).

Next, an operation of the path selecting section 203 will be explained.

Figure 4:
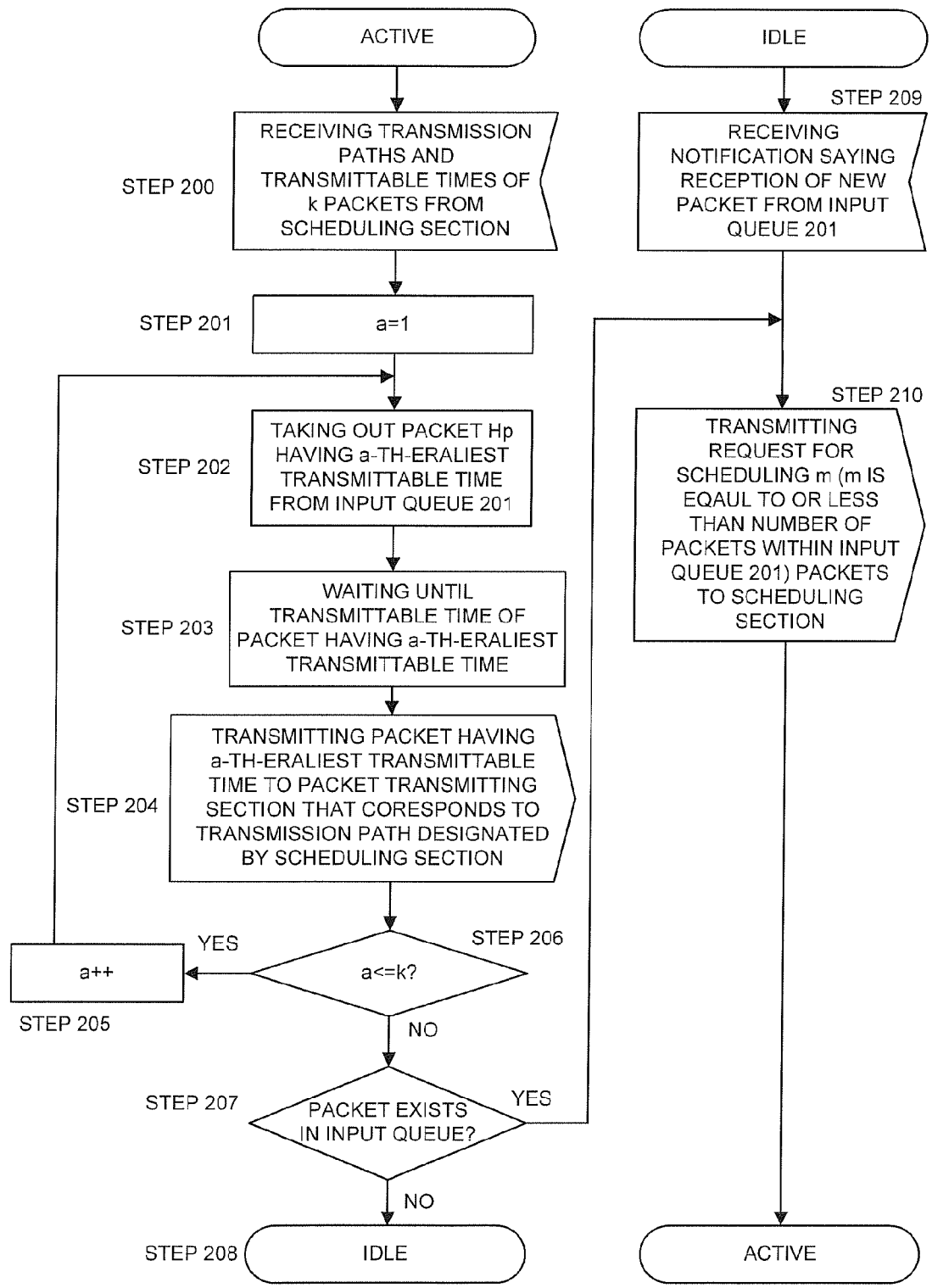
FIG. 4 is an operational flowchart (SDL process graph) that a path selecting section 203 follows.

The path selecting section 203 having received a notification from the scheduling section 202 transmits each packet at the notified transmittable time from the packet transmitting section 204 that corresponds to the notified transmission path. The operational flowchart (SDL process graph) that the path selecting section 203 follows at this time is shown in FIG. 4.

The path selecting section 203 having already requested the scheduling of the scheduling section 202 is in an active state, and upon receipt of a notification of the transmission paths and the transmittable times of k packets from the scheduling section 202 at this time (Step 200), assumes a=1 to be an initial value (Step 201), and takes out the packet having the a-th-earliest transmittable time from the input queue 201 (Step 202). The path selecting section 203 waits until the transmittable time of the packet having the a-th-earliest transmittable time (Step 203), and transmits the packet having the a-th-earliest transmittable time to the packet transmitting section 204 that corresponds to the transmission path designated by the scheduling section (Step 204).

The path selecting section 203 increments a (Step 205), and performs the process above until a=k is yielded.

When a=k is yielded (Step 206), and no packet exists in the input queue 201 (Step 207), the path selecting section 203 comes into an idle status, and waits for the arrival of the next packet (Step 208).

When the packet exists in the input queue 201 (Step 207), or when the path selecting section 203 has received a notification saying reception of a new packet from the input queue 201 (Step 209), the path selecting section 203 transmits the scheduling request to the scheduling section 202 (Step 210).

Additionally, the number of the packets for which the scheduling request is made is optional on the assumption that it is equal to or less than the number of the packets that exist in the input queue 201. For example, the number of the packets may be the number of all packets existing in the input queue 201 in some cases, and an optional upper limit thereof may be established in some cases.

In an example of FIG. 6 in which two packets are transmitted with the operation above, the packet 300-1 having previously arrived at the input queue 201 is transmitted later than the packet 300-2, whereas the prediction order of reception in the correspondent node is identical to the order in which the packets arrived at the input queue 201. That is, the order at the moment that the packets are outputted from the packet transmitting section 204 of the node 101 is reverse to the order in which the packets arrived at the node 101; however it is predicted that the order of the packets is reversed again within the network 400, and as a result, the order of arrival at the node 102 become similar to the order of arrival at the node 101. At this time, the delay of any of the packets is equal to or less than the delay that occurs in the case of employing only the path 1, or only the path 2, and yet the load is distributed to both paths.

Figure 2:
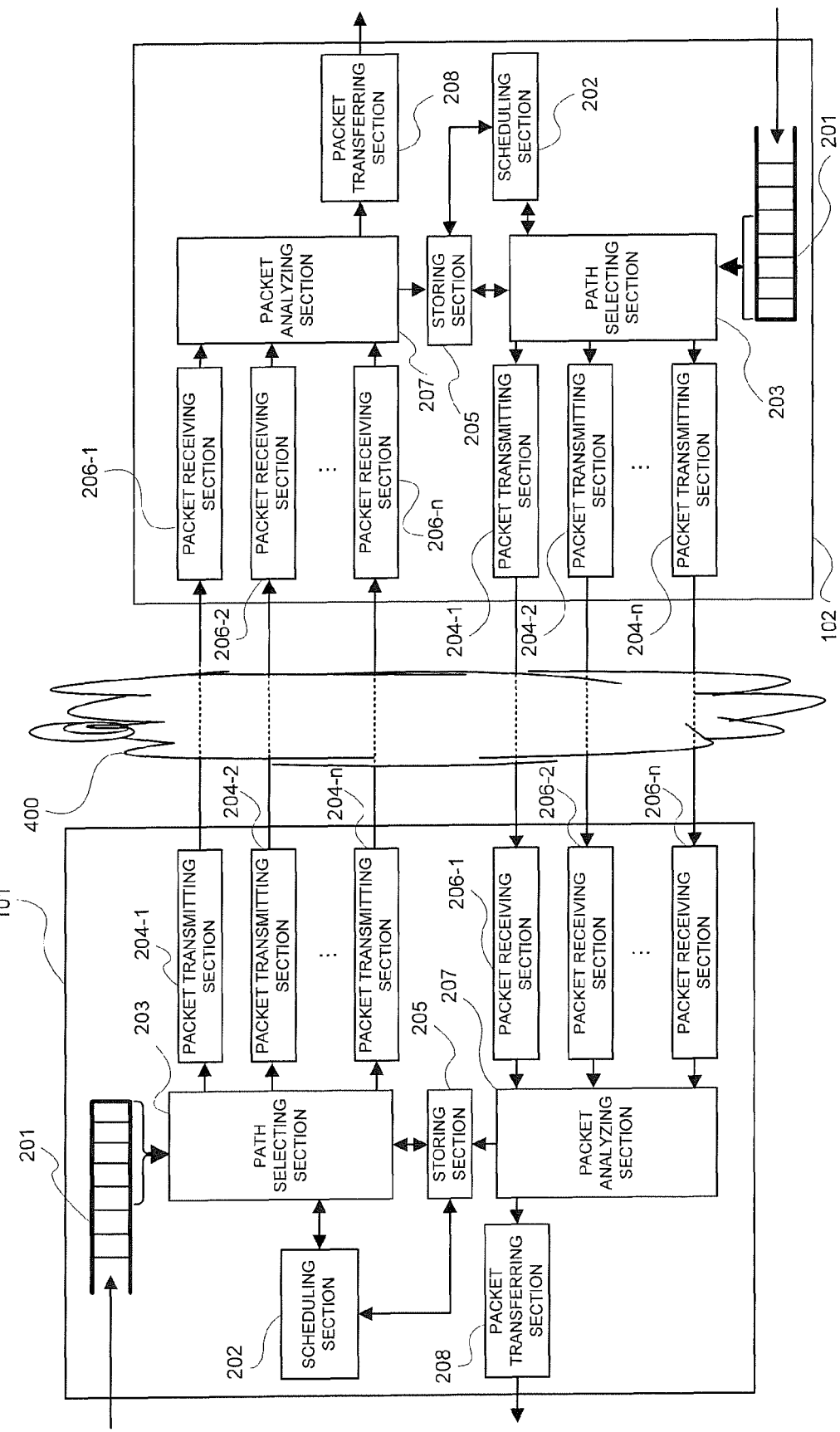
FIG. 2 is one configuration view of the embodiment.
Figure 3:
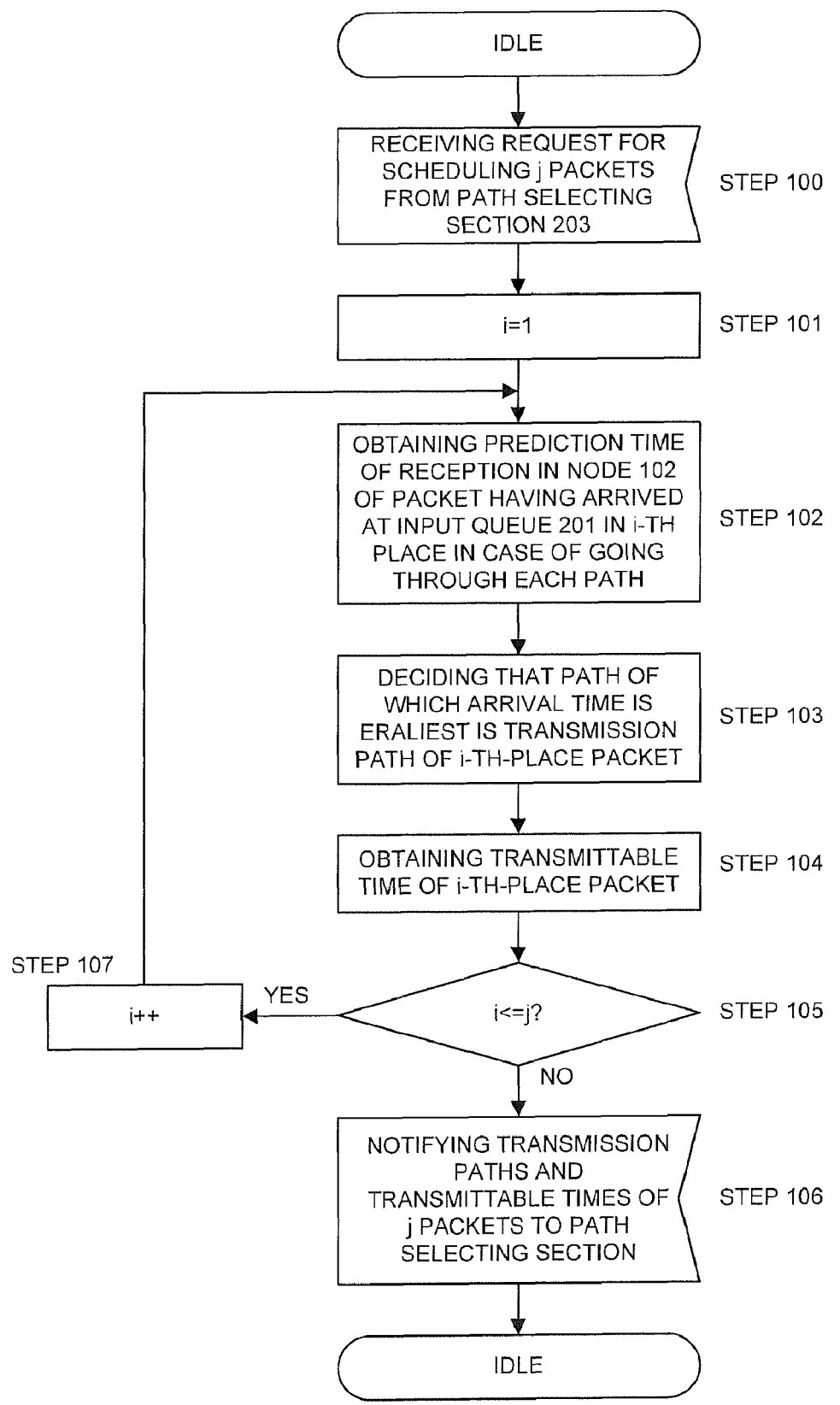
FIG. 3 is an operational flowchart (SDL process graph) of a scheduling section 202.

Above, by exemplifying the configuration in which two paths could be used, the operation of the present invention was explained, and algorithm shown in FIG. 3 and FIG. 4 is applicable to the case as well that three usable paths or more exist. In this case, a configuration of the device is, for example, one shown in FIG. 2, and the delay of the packet that is transferred between the node 101 and the node 102 of FIG. 2 is equal to or less than the delay that occurs in the case of employing only any of the paths between both nodes, and yet the band enlargement owing to the load distribution to each path is realized.

Further, each section was configured with hardware in the foregoing embodiments, while each section can be also configured with an information processing unit that operates under a control program for causing each section to operate.

I claim:

1. A node to utilize a plurality of paths including at least each of a first path and a second path, the node comprising:
    a selector to obtain prediction times of arrival of a plurality of packets queued to a reception queue at another node based upon estimation values of a delay and a velocity of each path, said first path having a first velocity, said second path having a second velocity less than the first velocity,
        where the selector is to decide transmission paths of said plurality of the packets based upon said prediction arrival times, so that an order of arrival of said plurality of the packets at said another node becomes equal to an order in which said plurality of the packets arrived,
        where the selector is to select the packet, from said plurality of packets, that is predicted to arrive at said another node without causing congestion to occur in each path irrespective of a sequence of said plurality of the packets within the reception queue; and,
    a transmitter to transmit only the selected packet on said decided transmission path,
    such that after a first packet of said plurality of packets has already been transmitted via said second path having the second velocity less than the first velocity, a second packet that is to arrive prior to the first packet is then transmitted via said first path having the first velocity greater than the second velocity,
    such that said second path having the second velocity is a default path, and said first path having the first velocity greater than the second velocity is selected just for the packets that are to arrive prior to other packets that have already been transmitted via said second path.

2. The node of claim 1, wherein said selector is to determine said prediction arrival time and said congestion based upon a transmission history of each path.

3. The node of claim 1, wherein said selector is to determine said prediction arrival time and said congestion based upon an estimation velocity of each path.

4. A non-transitory computer-readable data storage medium storing a control computer program that is executable by a node to utilize a plurality of paths including at least each of a first path and a second path, such that execution of the control computer program by the node causes a method to be performed, the method comprising:
    obtaining prediction times of arrival of a plurality of packets queued to a reception queue at another node based upon estimation values of a delay and a velocity of each path said first path having a first velocity, said second path having a second velocity less than the first velocity;
    deciding transmission paths of said plurality of the packets based upon said prediction arrival times so that an order of arrival of said plurality of the packets at said another node becomes equal to an order in which said plurality of the packets arrived;
    selecting the packet, out of said plurality of the packets, that is predicted to arrive at said another node without causing congestion to occur in each path, irrespective of a sequence of said plurality of the packets within the reception queue,
    such that after a first packet of said plurality of packets has already been transmitted via said second path having the second velocity less than the first velocity, a second packet that is to arrive prior to the first packet is then transmitted via said first path having the first velocity greater than the second velocity, such that said second path having the second velocity is a default path, and said first path having the first velocity greater than the second velocity is selected just for the packets that are to arrive prior to other packets that have already been transmitted via said second path.

5. The non-transitory computer-readable data storage medium of claim 4, wherein the method further comprises determining said prediction arrival time and said congestion based upon a transmission history of each path.

6. The non-transitory computer-readable data storage medium of claim 4, wherein the method further comprises determining said prediction arrival time and said congestion based upon an estimation velocity of each path.

7. A communication method between a first node and a second node that are connected via a plurality of paths including at least each of a first path and a second path, the communication method comprising:

predicting or detecting congestion of said second path, said first path having a first velocity, said second path having a second velocity less than the first velocity;

when congestion of said second path is predicted or detected, transmitting to said first path a second packet that has a late arrival time and has yet to be have been queued to or placed at a second place in an order from a top of a reception queue of the first node, out of two packets or more that have arrived at said first node; and, after transmitting said second packet, transmitting to said second path a first packet that has an arrival time earlier than that of said second packet and yet has been queued to a top of said reception queue of said first node, such that after a first packet of said plurality of packets has already been transmitted via said second path having the second velocity less than the first velocity, a second packet that is to arrive prior to the first packet is then transmitted via said first path having the first velocity greater than the second velocity, such that said second path having the second velocity is a default path, and said first path having the first velocity greater than the second velocity is selected just for the packets that are to arrive prior to other packets that have already been transmitted via said second path.

8. The communication method of claim 7, wherein the transmission of said first packet from said second path is made after predicting or detecting removal of the congestion of said second path.

9. The communication method of claim 7, further comprising determining prediction of said congestion or prediction of removal of said congestion based upon a transmission history of each path.

10. The communication method of claim 7, further comprising determining prediction of said congestion or prediction of removal of said congestion based upon an estimation velocity of each path.

11. A communication method for a first node that is connected to a second node via a plurality of paths including a first path and a second path, the communication method comprising:

receiving packets;

queuing the packets to a reception queue;

when a plurality of the packets queued are transmitted to said reception queue to said second node, determining transmission paths of said plurality of the packets from estimation values of a delay and a velocity of each path, so that an order of prediction times of arrival of said plurality of the packets at said second node becomes equal to an order of times in which said plurality of the packets arrived at said first node;

selecting the packet, out of said plurality of packets, that is predicted to arrive at said second node without causing congestion to occur in each path, from among said reception queue, irrespective of a sequence of said plurality of packets within said reception queue; and, transmitting said selected packet to said determined transmission paths, such that after a first packet of said plurality of packets has already been transmitted via said second path having the second velocity less than the first velocity, a second packet that is to arrive prior to the first packet is then transmitted via said first path having the first velocity greater than the second velocity, such that said second path having the second velocity is a default path, and said first path having the first velocity greater than the second velocity is selected just for the packets that are to arrive prior to other packets that have already been transmitted via said second path.

12. The communication method of claim 11, further comprising determining said prediction arrival time and said congestion based upon a transmission history of each path.

13. The communication method of claim 11, further comprising determining said prediction arrival time and said congestion based upon an estimation velocity of each path.

* * * * *